J. ROSSMAN.
ALCOHOL LAMP.
APPLICATION FILED FEB. 28, 1912.

1,030,922.

Patented July 2, 1912.

Witnesses
F. W. Thomas
Sam Raney

Joseph Rossman
Inventor
by
J. M. Thomas
Attorney

COLUMBIA PLANOGRAPH CO., WASHINGTON, D. C.

UNITED STATES PATENT OFFICE.

JOSEPH ROSSMAN, OF PROVO, UTAH.

ALCOHOL-LAMP.

1,030,922.     Specification of Letters Patent.     Patented July 2, 1912.

Application filed February 28, 1912. Serial No. 680,542.

*To all whom it may concern:*

Be it known that I, JOSEPH ROSSMAN, a citizen of the United States, residing at Provo city, in the county of Utah and State of Utah, have invented certain new and useful Improvements in Alcohol-Lamps, of which the following is a specification.

My invention relates to alcohol lamps, and has for its object to provide a wickless lamp in which to burn alcohol for heating purposes, and by which to heat a small amount of water, milk or other liquid within a limited time with but a small quantity of alcohol. These objects I accomplish with the device illustrated in the accompanying drawings in which similar letters of reference indicate like parts throughout the several figures, and as described in the specifications forming a part of this application and as specifically pointed out in the appended claims.

Figure 1:
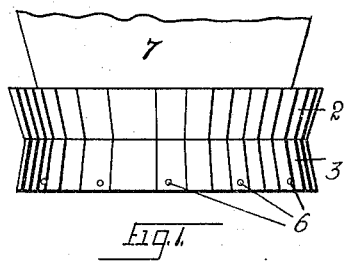
Figure 2:
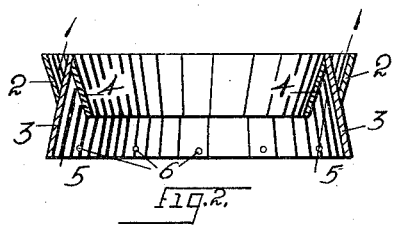
Figure 4:
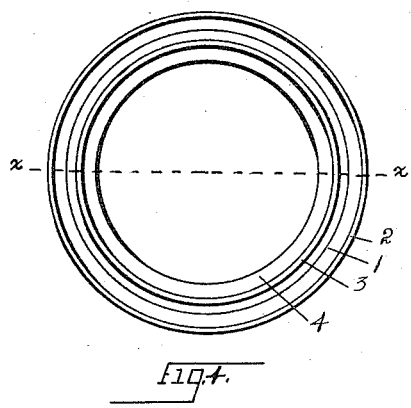
Figure 3:
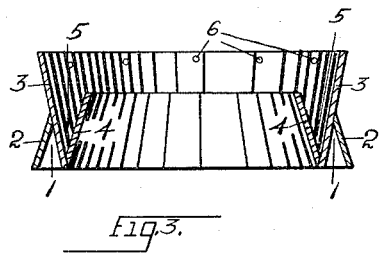

Figure 1 is an elevation of the device, with a part of a liquid holding vessel thereon. Fig. 2 is a vertical section on line $x$ $x$ of Fig. 4. Fig. 3 is a vertical section of the device inverted as used when more heat is desired. Fig. 4 is a plan of the device.

My device consists of an inverted frusto-conically shaped member 2, which is soldered, brazed or otherwise attached to the peripheric face of the hollow frustum of another cone-shaped member 3 and thereby forming an annular V-shaped channel 1. The purpose being to provide a channel having its bottom parallel with the base of said device, in order that alcohol poured in said channel will be equally distributed therein. Within the apex end of said frusto-conically shaped member 3 is soldered, brazed or otherwise attached the base edge of another frusto-conically shaped member 4. The vertical height of said last mentioned member being less than that of said cylinder 3. The purpose being to provide an annular seat for the liquid holding vessel 7 and without a closure or bottom for said seat. The bottom is omitted for economical and sanitary reasons and to provide an open air space around the bottom of the vessel, in order that milk or other liquids of a similar nature will not burn and adhere to the bottom of the said vessel 7 before the required amount of heat is supplied to the contents. Holes 6 are provided near the base of said member 3 to allow free circulation of air within said cone. When it is desired to supply more heat to the vessel or when the vessel to be used has a larger base than will seat within the base end of the said member 4, the said device is inverted as shown in Fig. 3 and the alcohol is placed in the channel 5 formed between the base of said member 3 and the apex of said cone 4. The channel 5 is larger than said channel 1 thereby holding more fuel and supplying more heat. It is intended to have the bottom of the said vessel 7 below the flame when using the device in the position shown in Figs. 1 and 2, which will prevent burning on the bottom. When using the device in the inverted position shown in Fig. 3, the flame is applied on the bottom as well as around the sides of the vessel. The amount and duration of the heat are regulated by the amount of alcohol supplied within the said channels, the V-shaped channels providing a wider surface for the burning alcohol when more is supplied than when a smaller amount is used, and a broader flame.

Having thus described my invention I desire to secure by Letters Patent and claim:—

1. An alcohol lamp consisting of three frusto-conically shaped members fastened concentrically together to form a V-shaped annular channel and an inverted V-shaped annular channel.

2. An alcohol lamp consisting of a frusto-conically shaped member having openings therein near the base; an inverted frusto-conically shaped member having its apex fastened to the face of the first mentioned member at practically the intermediate line forming an annular V-shaped channel; and another inverted frusto-conically shaped member having the edges of its base attached to the edge of the apex of the said first mentioned member forming an inverted V-shaped annular channel.

3. An alcohol lamp consisting of three frusto-conically shaped members fastened concentrically together to form a V-shaped annular channel with the edges thereof in the same horizontal plane, and an inverted V-shaped annular channel concentrically within said first mentioned channel with the plane of the edge of the outer wall of said channel below the plane of the edge of the inner wall thereof.

In testimony whereof I have affixed my signature in presence of two witnesses.

JOSEPH ROSSMAN.

Witnesses:
 SAM RANEY,
 GOULD B. BLAKELY.

Copies of this patent may be obtained for five cents each, by addressing the "Commissioner of Patents, Washington, D. C."